United States Patent [19]
Sato

[11] Patent Number: 5,511,068
[45] Date of Patent: Apr. 23, 1996

[54] MOBILE COMMUNICATION SYSTEM CAPABLE OF TRANSMITTING AND RECEIVING A RADIO SIGNAL OBTAINED BY TDMA AND CDMA WITHOUT INTERFERENCE

[75] Inventor: Toshifumi Sato, Tokyo, Japan

[73] Assignee: NEC Corporation, Japan

[21] Appl. No.: 349,885

[22] Filed: Dec. 6, 1994

[30] Foreign Application Priority Data

Dec. 8, 1993 [JP] Japan ..................................... 5-307635

[51] Int. Cl.$^6$ ........................................................ H04J 13/00
[52] U.S. Cl. ............................... 370/18; 370/84; 375/205; 375/207
[58] Field of Search ............................. 370/18, 50, 84; 375/201, 203, 205, 207, 231

[56] References Cited

U.S. PATENT DOCUMENTS

| | | | |
|---|---|---|---|
| 4,754,453 | 6/1988 | Eizenhöfer | 370/18 X |
| 4,799,252 | 1/1989 | Eizenhoffer et al. | 379/59 |
| 5,295,153 | 3/1994 | Gudmundson | 370/18 X |
| 5,345,439 | 9/1994 | Marston | 370/18 |
| 5,410,568 | 4/1995 | Schilling | 370/18 X |
| 5,420,850 | 5/1995 | Umeda et al. | 370/18 |

FOREIGN PATENT DOCUMENTS

| | | |
|---|---|---|
| 4-351130 | 12/1992 | Japan . |
| 9315573 | 8/1993 | WIPO . |

OTHER PUBLICATIONS

J. Ruprecht, et al., "Code Time Divisional Multiple Access: An Indoor Cellular System", IEEE, vol. 2, May 13, 1992, pp. 736–739.

A. Farago, et al., "Nearly Optimum Scheduling in Mobil CDMA Packet Radio Networks", IEEE, vol. 2, Oct. 14, 1992, pp. 769–773.

Primary Examiner—Melvin Marcelo
Attorney, Agent, or Firm—Ostrolenk, Faber, Gerb & Soffen

[57] ABSTRACT

In a communication system from a mobile station to a base station, a transmitter of the mobile station subjects a sequence of transmission signals to both of time division multiple access (TDMA) and code division multiple access (CDMA) to produce a radio output signal located in a time slot of a frame. The radio output signal obtained by the TDMA and CDMA is filtered or inversely spread to remove interference and noise from the radio output signal by the use of an adaptive filter which has taps controlled by an adaptive controller.

22 Claims, 6 Drawing Sheets

5,511,068

MOBILE COMMUNICATION SYSTEM CAPABLE OF TRANSMITTING AND RECEIVING A RADIO SIGNAL OBTAINED BY TDMA AND CDMA WITHOUT INTERFERENCE

BACKGROUND OF THE INVENTION

This invention relates to a mobile communication system which includes a base station and a mobile station communicable with the base station and, in particular, to a transmitter and a receiver used in the mobile communication system.

In general., such a mobile communication system of the type described is known in the art as a cellular system. Conventionally, a wide variety of the cellular systems have been proposed, which may be, such as a standard system in Japan abbreviated to PDC:RCR STD 27A, a North American standard system abbreviated to TIA IS54, an Europe Standard system abbreviated to ETSI GSM, and another North American standard system abbreviated to TIA IS95. Herein, it is to be noted that the PDC:RCR STD 27A uses a time division multiple access (TDMA) method while the TIA IS95 uses a code division multiple access (CDMA) method.

In the TDMA method, it is difficult to avoid a frequency interference which might result from use of an identical frequency. Therefore, the identical frequency can not be assigned to adjacent ones of cells but should be used in remote cells. Accordingly, the TDMA method has a shortcoming that a utilization efficiency of frequencies is low.

On the other hand, the CDMA method is advantageous in that the same frequencies can be used in every one of cells and that a path diversity effect can be accomplished by the use of a simple rake receiver which is well known in the art.

However, it is difficult in the CDMA method that an interference among channels can not be completely rendered into zero. From this fact, it is readily understood that the CDMA method is not suitable for simultaneously transmitting a plurality of information signals which are individually produced from different signal sources.

Herein, proposal has been made in U.S. Pat. No. 4,799, 252 as regards another mobile communication system that comprises a plurality of base stations and a plurality of mobile stations communicable with the base stations through forward links and reverse links and that carries out communication by using a combination of time division multiplexing (TDM) and code division multiplexing (CDM). The forward links are directed from the base stations towards the mobile stations while the reverse links are directed from the mobile stations towards the base stations.

Herein, it is to be noted in the above-referenced U.S. Patent that the combination of the TDM and the CDM is only used in the forward links from each of the base stations to the mobile stations to accurately synchronize information signals of all channels that are sent from each base station to the mobile stations. This shows that consideration is made only about a connection from a single base station to the mobile stations, N in number, where N is an integer greater than unity. In other words, no consideration is made at all in the U.S. Patent as regards multiple connections from the base stations (N in number) to the mobile stations (N in number) or from the base stations (N in number) to a single one of the mobile stations.

From this fact, it is readily understood that, when the TDM and the CDM methods are used for individually transmitting a plurality of information signals, synchronization should be accurately established using the individual information signals in the U.S. Patent.

Alternatively, a communication method is disclosed in Japanese Unexamined Patent Publication No. Hei 4-351130, namely, 351130/1992 so as to transmit and receive a data signal sequence by the CDM method. More specifically, a plurality of transmission data signals are subjected to the code division multiplexing by the use of the same spread codes by a transmitter and successively transmitted at time intervals displaced relative to each other. Thereafter, a receiver receives the plurality of the transmission data signals by the use of an inverse filter. In this method, the inverse filter is controlled so that reception response of the inverse filter approximates a delta function of Kvonecker. However, this method is disadvantageous in that a multiplex number for the CDM is restricted because a time deviation of the transmission data signals must be longer than a sum of a chip time of the spread code and a delay expansion in a transmission path.

SUMMARY OF THE INVENTION

It is an object of this invention to provide a radio communication system which is capable of increasing a capacity of channels.

It is another object of this invention to provide a transmitter which can be used in a mobile station and which improves a utilization efficiency of frequencies.

It is still another object of this invention to provide a receiver which can be used in a base station and which can receive a plurality of data signals without channel interferences.

It is yet another object of this invention to provide a mobile station which can readily trace fading inherently appearing in mobile communication.

It is another object of this invention to provide a mobile station which is applicable to multibit rate services which would be required in future.

A mobile station to which this invention is applicable is for use in a radio communication system to produce a radio output signal. The mobile station comprises a transmitter operable in response to a sequence of transmission signals which is divisible into a succession of frames and which has a predetermined rate.

According to an aspect of this invention, the transmitter comprises rate converting means supplied with the transmission signal sequence for rate converting the transmission signal sequence into a sequence of rate converted signals which has a second rate higher than the first rate and which lasts for a time slot shorter than each of the frames, spread code producing means for producing a preselected spread code which is assigned to the transmitter and which is divided into a plurality of chips, code division multiple access means supplied with the preselected spread code and said rate converted signal sequence for carrying out code division multiple access operation of the rate converted signal sequence in accordance with the preselected spread code to produce a sequence of spread signals which lasts for the time slot and which is related to the preselected spread code, and means for producing said spread signal sequence as said radio output signal.

According to another aspect of this invention, a receiver is communicable with the transmitter mentioned above and is given the radio output signal as a reception input signal which conveys the spread signal sequence, to produce a sequence of reception output signals. The receiver comprises demodulating means supplied with the radio input signal for demodulating the reception input signal into a sequence of baseband signals concerned with the spread signal sequence, adaptive filter means coupled to the demodulating means for adaptively filtering said baseband signal sequence to produce a sequence of reproduced signals corresponding to the transmission signal sequence, and output means for producing the reproduced signal sequence as the reception output signal sequence.

DESCRIPTION OF THE PREFERRED EMBODIMENTS

Figure 1:
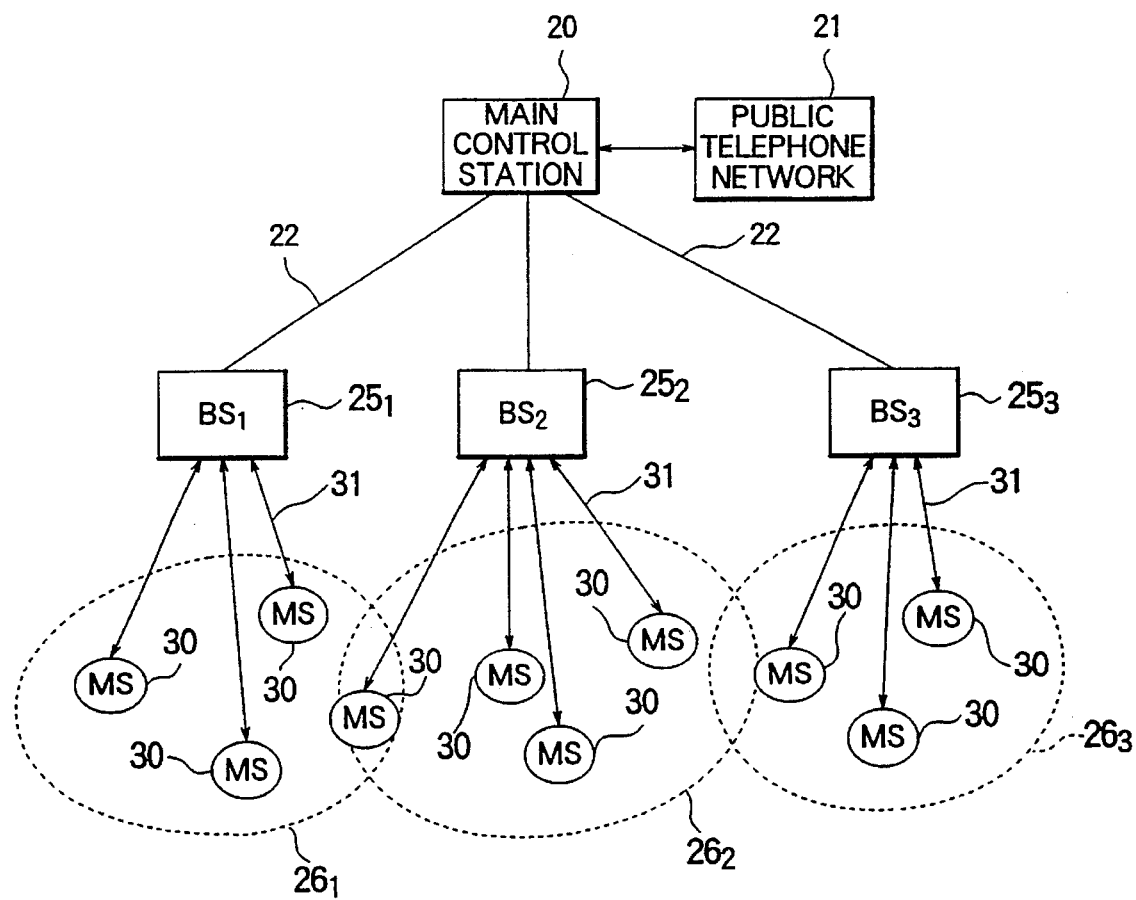
FIG. 1 is a block diagram of a communication system to which this invention is applicable.

Referring to FIG. 1, description will be at first made about a general cellular system which is used in combination with a main control station 20 connected to a public telephone network 21 and which comprises a plurality of base stations (abbreviated to BS) 25 connected to the main control station 20 through transmission lines 22. In the illustrated example, only three of the base stations (denoted by BS1, BS2, and BS3 in FIG. 1) are shown for simplification of the drawing and specified by $25_1$, $25_2$, and $25_3$. The base stations $25_1$ to $25_3$ have service areas, namely, cells $26_1$, $26_2$, and $26_3$ two adjacent ones of which are partially overlapped to each other, as illustrated in FIG. 1. However, it is noted in this invention that the cells $26_1$ to $26_3$ may be mostly overlapped to one another.

In FIG. 1, it is assumed in FIG. 1 that a plurality of mobile stations (MS) collectively shown at 30 run or stay in each of the cells $26_1$ to $26_3$. Each of the mobile stations 30 is bidirectionally communicable with the base station or stations 25 (suffixes omitted) through radio channels 31 assigned to the respective mobile stations 30. In other words, the mobile stations 30 are coupled to the base stations $25_1$ to $25_3$ through the radio channels 31 not only in a forward direction from the base stations $25_1$ to $25_3$ to the mobile stations 30 but also in a reverse direction from the mobile stations 30 to the base stations $25_1$ to $25_3$. This shows that the base stations $25_1$ to $25_3$ and the mobile stations 30 are communicable with one another through forward links and reverse links.

Herein, it is noted that the base stations $25_1$ to $25_3$ are synchronously operated in response to a timing signal delivered from the main control station 20 through the transmission lines 22 and that the mobile stations 30 send an information signal, such as a data signal, a message signal, to the base stations $25_1$ to $25_3$ through the radio channels of the reverse link in a manner to be described later in detail.

Figure 2:
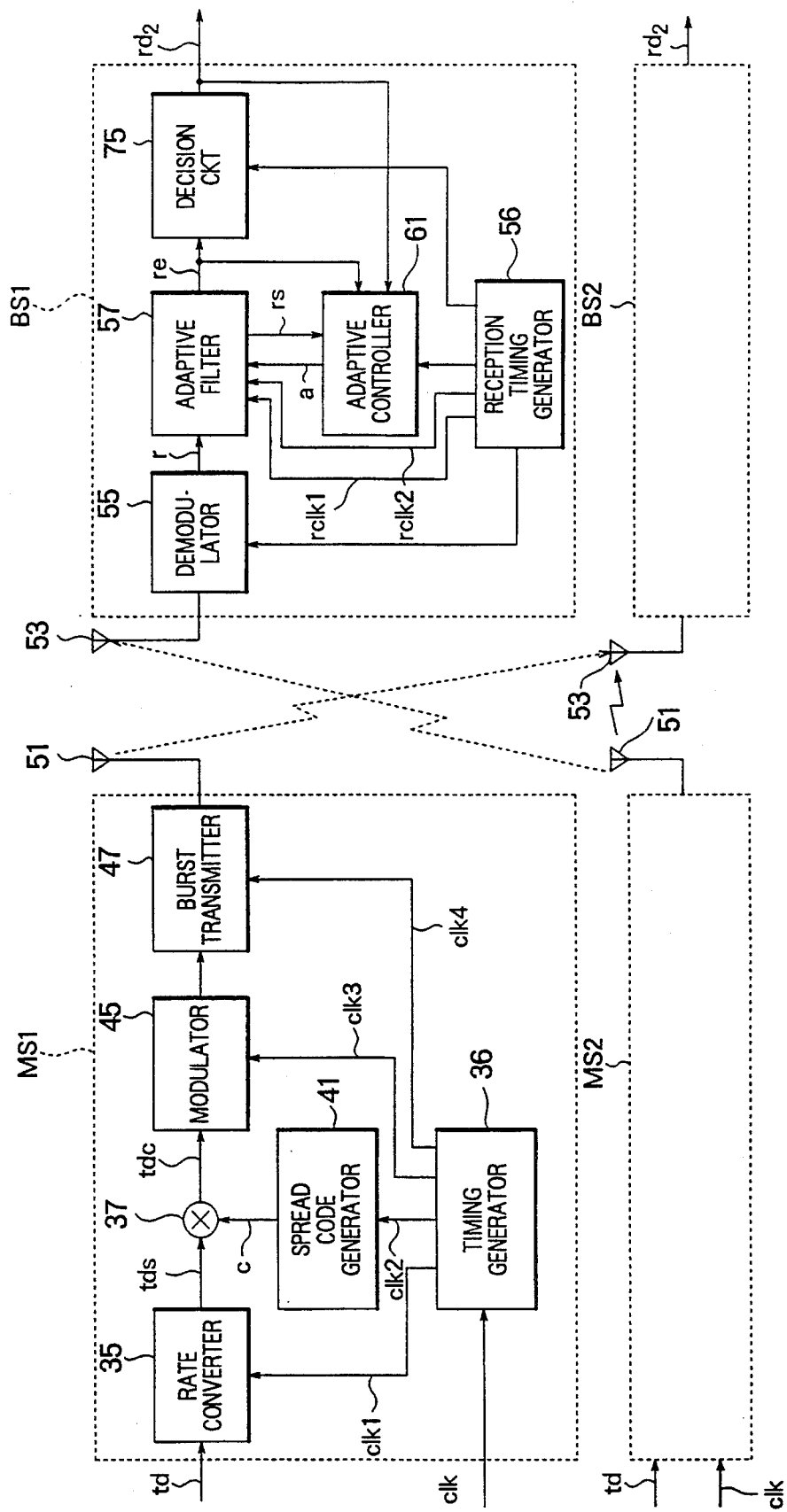
FIG. 2 is a block diagram of a communication system according to a preferred embodiment of this invention.

Referring to FIG. 2, description will be directed to communication carried out from each of the mobile stations 30 to the base stations 25 through the reverse links. For brevity of description, only two of the mobile stations denoted at MS1 and MS2 are illustrated in FIG. 2 together with two of the base stations denoted at BS1 and BS2. Inasmuch as both the mobile stations MS1 and MS2 are similar in structure and operation to each other while both the base stations BS1 and BS2 are also similar to each other, description will be mainly restricted to the mobile station MS1 and the base station BS1 alone hereinunder.

In FIG. 2, the mobile station MS1 is specified by a mobile transmitter while the base station BS1 is specified by a base station receiver. In other words, a mobile receiver and a base station transmitter are omitted from FIG. 2. This is because the mobile receiver and the base station transmitter are not directly concerned with this invention. In the illustrated example, the mobile stations MS1 and MS2 have the radio channels which are specific to them and which will be described in detail.

As illustrated in FIG. 2, the mobile station MS1 is supplied with a sequence of transmission signals td and a sequence of clock signals clk from a signal source and a clock generator (not shown). The clock signals clk are produced in response to a timing control signal delivered from the base station BS1 through the forward link.

The transmission signal sequence has a predetermined symbol rate and may carry either a data signal or a message signal. The clock signals clk has a clock rate or frequency higher than the predetermined symbol rate, as will become clear as the description proceeds. In the illustrated example, the predetermined symbol rate is assumed to be equal to a predetermined bit rate.

Figure 3:
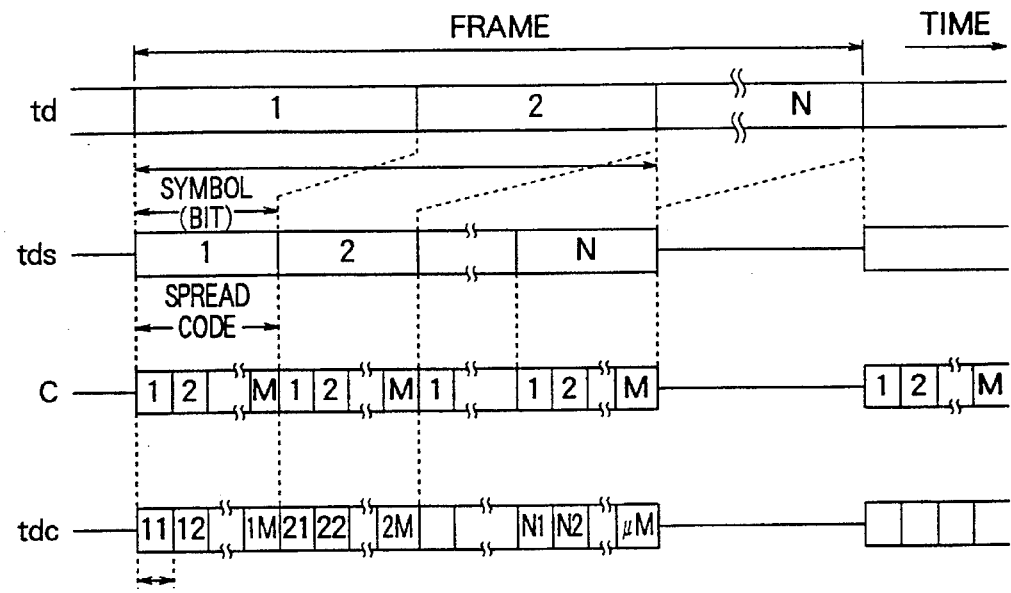
FIG. 3 is a time chart for use in describing operation of a transmitter illustrated in FIG. 2.

Referring to FIG. 3 together with FIG. 2, the transmission signal sequence is divided into a succession of frames each of which is composed of N bits where N is an integer greater than unity and which has a frame period, as shown along a top line of FIG. 3. Each frame of the mobile stations MS is determined in response to the timing control signal sent from the base station BS and is synchronized with one another.

In FIG. 2, the transmission signal sequence td is given to a rate converter 35 while the clock signal sequence clk is given to a timing generator 36. The timing generator 36 delivers a sequence of first internal clock signals clk1 to the rate converter 35 in response to the clock signals clk. The rate converter 35 converts the transmission signal sequence td into a sequence of converted signals tds in accordance with the first internal clock signals clk1, as shown along a second line of FIG. 3. In other words, the predetermined bit rate of the transmission signal sequence td is converted into a first internal symbol rate, namely, a first internal bit rate.

As a result, the converted signal sequence tds is compressed within a single time slot which is shorter than the frame period of the transmission signal sequence td and is produced from the rate converter 35 in the form of a burst and is sent to a multiplier 37. This shows that the transmission signal sequence is subjected to time division multiplex access (TDMA) by the rate converter 35.

It is surmised that the converted signal sequence tds has a bit or symbol rate equal to L times the predetermined bit rate of the transmission signal sequence td, where L is an integer greater than unity. The number L may be, for example, 16 and may be called a multiplex number in the time division multiplex access and is equal to a factor obtained by dividing the frame period by the time slot period.

On the other hand, the timing generator 36 supplies a spread code generator 41 with a sequence of second internal clock signals clk2. The spread code generator 41 generates a sequence of spread codes c peculiar to the mobile station MS1, in synchronism with the second internal clock signal sequence clk2, as shown along a third line of FIG. 3. As is apparent from FIG. 3, the spread code sequence c is composed of M chips appearing within each bit or symbol of the converted signals tds where M is an integer greater than unity and may be equal, for example, to 16. Therefore, it may be said that the spread code sequence c is composed of M chips and therefore has a spread factor of M.

Supplied with the spread code sequence c and the converted signal sequence tds, the multiplier 37 carries out code division multiple access (CDMA) operation to produce a sequence of spread signals tdc. Taking the above into consideration, the spread signal sequence tdc has a chip rate equal to (L×M) times the predetermined bit rate of the transmission signal sequence td.

The spread signal sequence tdc is given to a modulator 45 which is supplied with a sequence of third internal clocks clk3. The illustrated modulator 45 carries out quadrature phase shift keying (QPSK) of the spread signal sequence tdc in accordance with the third internal clocks clk3 to supply a sequence of modulated signals to a burst transmitter 47 which is operable in response to a sequence of fourth internal clocks clk4 supplied from the timing generator 36.

Since the fourth internal clocks clk4 serve as a control signal indicative of a specific time slot assigned to the own mobile transmitter, the modulated signal sequence is allocated to the specific time slot. A single time slot alone is usually assigned as the specific time slot within each frame but a plurality of time slots may be assigned within each frame. Thus, when the number of assigned time slots are changed from one to another, it is possible to change an information rate in every specific time slot. This means that a multibit rate transmission can be achieved by changing the information rate in every time slot.

It is noted here that the mobile stations, such as MS1 and MS2, have radio channels assigned to them, respectively, and that the modulated signal sequence which is allocated to the specific time slot in the assigned radio channel is transmitted through a mobile antenna 51 in the form of the burst to the base station or stations BS1 and/or BS2.

Figure 4:
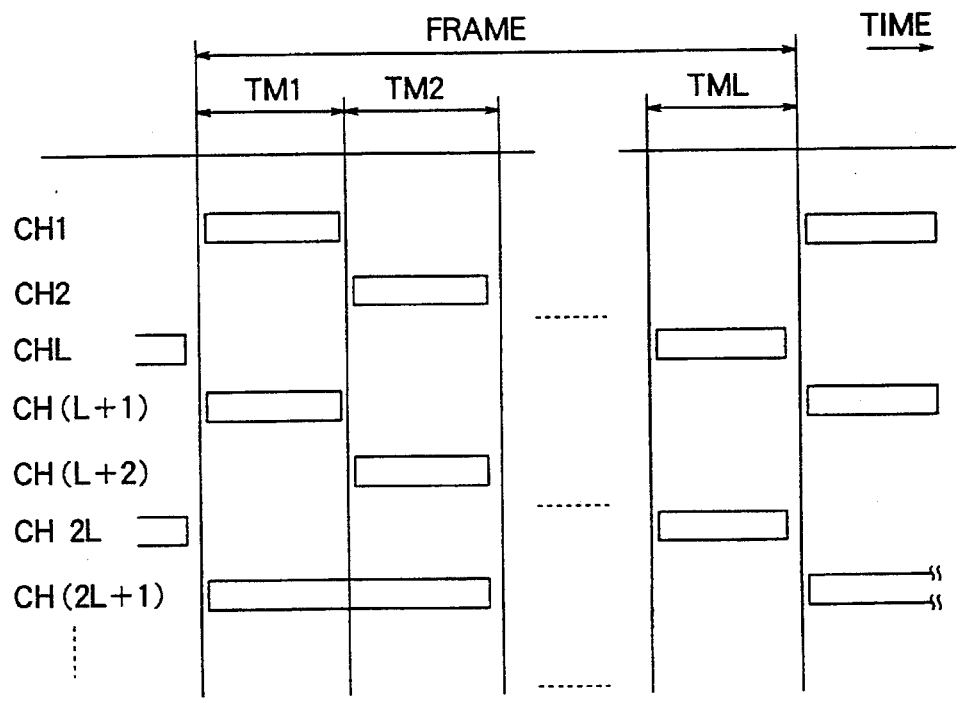
FIG. 4 is a time chart for use in describing a relationship among channels assigned to transmitters used in the communication system illustrated in FIG. 2.

Referring to FIG. 4, illustration is made about a relationship between time slots TM of each frame and a plurality of radio channels which are allocated to the mobile stations, such as MS1 and MS2. In the example being illustrated, it is assumed that first through L-th time slots are allocated to first through (2L+1)-th ones of the mobile stations 30. This shows that each frame is divided into first through L-th ones of the time slots TM1 to TML that are allocated to one or a plurality of the first through the (2L+1)-th channels. Specifically, the first time slot TM1 is allocated to the first, the (L+1)-th, and the (2L+1)-th radio channels while the second time slot TM2 is allocated to the second, the (L+2)-th, and the (2L+1)-th channels. From this fact, it is readily understood that both the first and the second time slots TM1 and TM2 are assigned to the (2L+1)-th channel. Thus, a plurality of the time slots TM may be allocated to a single channel while each time slot may be used in common to a plurality of the channels. This is because the code division multiplex access is carried out in each of the mobile transmitter included in the mobile station. In any event, each mobile station transmits the burst within the assigned time slot or time slots TM.

As readily understood from the above, each mobile station MS1 and MS2 illustrated in FIG. 2 transmits a radio output signal by carrying out both the time division multiplex access (TDMA) operation and the code division multiplex access (CDMA) operation in response to the transmission signal sequence td in the manner mentioned before.

The radio output signal of each mobile station MS1 and MS2 is received by the base station BS1 or base stations BS1 and BS2, as symbolized by broken lines in FIG. 2. As a result, the radio output signal might suffer from any interferences during transmission from the mobile stations MS1 and MS2 to the base stations BS1 and BS2 and is received by each base station BS1 and BS2 as a radio input signal, although description will be restricted only to the base station BS1 specified by the base station receiver.

In the illustrated base station BS1, the radio input signal is given through a receiver antenna 53 to a demodulator 55 to be demodulated into a sequence of baseband signals r under control of a reception timing generator 56. The baseband signal sequence r is obtained by the time division multiplex access (TDMA) operation and the code division multiplex access (CDMA) operation and includes an information signal destined to the own base station BS1 together with other information signals directed to any other base stations, such as BS2. The other information signals should be processed as interference components and separated from the information signal destined to the base station BS1.

To this end, inverse spread operation is carried out by the use of an adaptive filter 57 which is operable in cooperation with an adaptive controller 61 controlled by the reception timing generator 56 in a manner to be described later.

Figure 5:
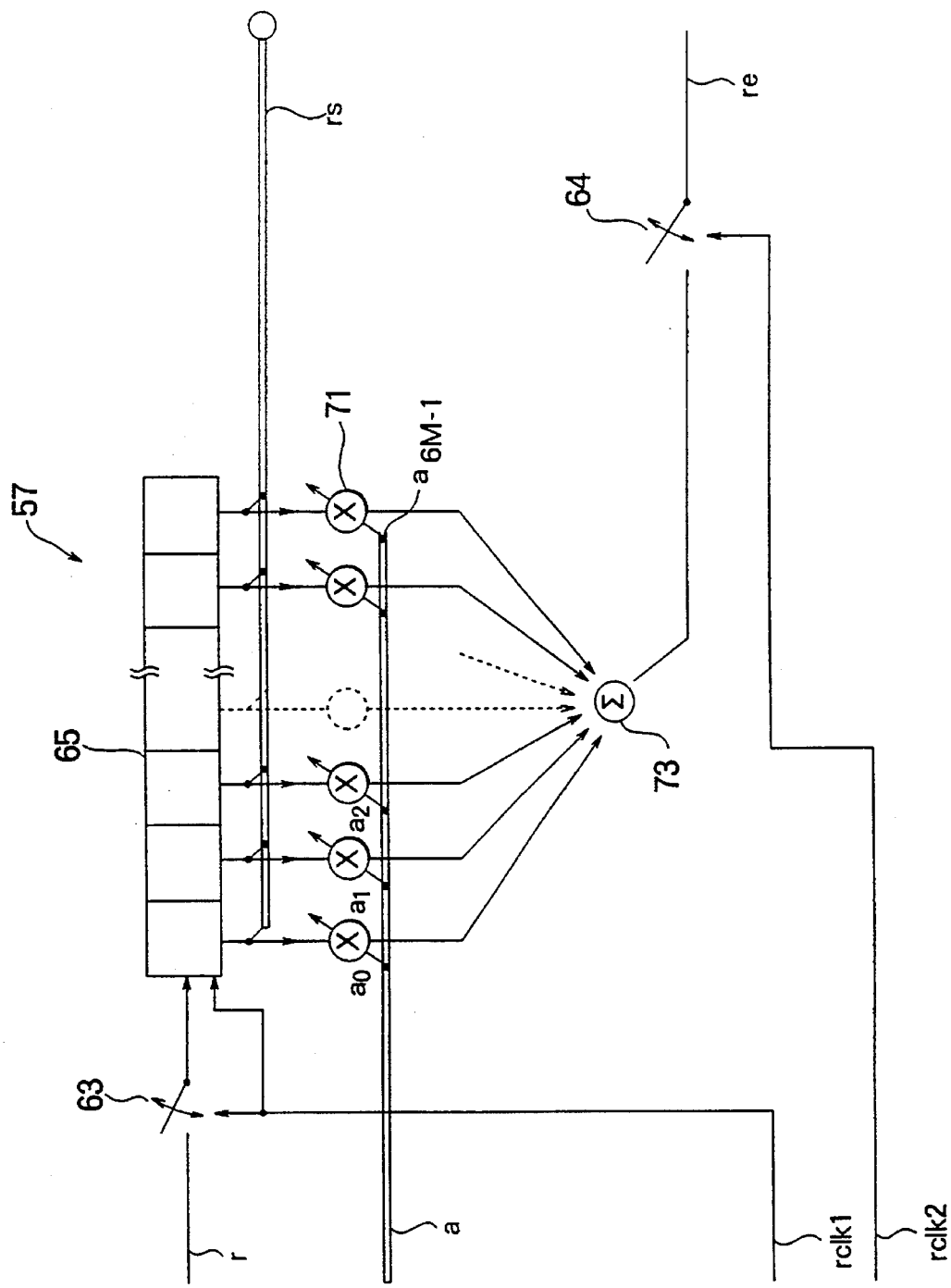
FIG. 5 is a block diagram of an adaptive filter used in the communication system illustrated in FIG. 2.

Referring to FIG. 5 afresh together with FIG. 2, the adaptive filter 57 comprises first and second samplers 63 and 64 which are supplied from the reception timing generator 56 with first and second reception clocks rclk1 and rclk2, respectively. Herein, it is to be noted that the first and the second reception clocks rclk1 and rclk2 have first and second reception clock rates equal to twice the chip rate and the symbol or bit rate of the baseband signal sequence r, respectively. Since the first sampler 63 is supplied from the demodulator 55 with the baseband signal sequence r, the baseband signal sequence r is sampled at a first rate equal to twice the chip rate to produce a sequence of sampled baseband signals. The sampled baseband signal sequence is sent to a shift register 65 in synchronism with the first reception clocks rclk1.

The illustrated shift register 65 has a plurality of stages the number of which is greater than the spread factor M and which is preferably equal to 6M, as exemplified in FIG. 5. This shows that the shift register 65 has zeroth through (6M−1)-th ones of the stages from which zeroth through (6M−1)-th taps are derived in this example.

The shift register 65 is controlled by the adaptive controller 61, as shown in FIG. 2. To this end, the zeroth through (6M−1) taps of the shift register 65 are connected to the adaptive controller 61 to produce zeroth through (6M−1)-th tap output signals. In addition, the zeroth through the (6M−1)-th taps of the shift register 65 are also connected to zeroth through (6M−1)-th multipliers collectively depicted at 71 and are supplied from the adaptive controller 61 with zeroth through (6M−1)-th tap coefficients $a_i$, where i is variable between zero and (6M−1), both inclusive. Herein, the zeroth through (6M−1)-th tap coefficients $a_i$ may be collectively called a control signal.

Thus, the zeroth through (6M−1)-th tap output signals rs are sent to the first through the (6M−1)-th multipliers 71 to be multiplied by the first through the (6M−1)-th tap coefficients $a_i$, respectively, and to produce zeroth through (6M−1)-th product signals representative of zeroth through (6M−1)-th products. The zeroth through the (6M−1)-th product signals are equal to products of the zeroth through (6M−1)-th tap output signals and zeroth through (6M−1)-th tap coefficient signals indicative of the tap coefficients $a_i$.

The zeroth through the (6M−1)-th product signals are sent to a sum circuit 73 to be summed up and to be produced from the sum circuit 73 as a sum signal indicative of a sum of the zeroth through (6M−1)-th product signals. From this fact, it is readily understood that a combination of the shift register 65, the multipliers 71, and the sum circuit 73 forms a finite impulse response (FIR) filter.

The sum signal is delivered to the second sampler 64 and sampled at the second reception clock rate, namely, the transmission symbol rate rclk2 to be produced as a sequence of reproduced signals re, as will become clear later. The reproduced signal sequence re is sent to a decision circuit 75 on one hand and to the adaptive controller 61 (FIG. 2) on the other hand. The decision circuit 75 decides each of the reproduced signals to extract a sequence of decided information signals rd1 free from any noise and to produce the decided information signal sequence rd1 as a sequence of reception output signals.

Consequently, the adaptive controller 61 is operable in response to the reproduced signal sequence re and the zeroth through (6M−1)-th tap output signals rs supplied from the adaptive filter 57. Moreover, the adaptive controller 61 is also supplied with the decided information signals from the decision circuit 75. Specifically, the adaptive controller 61 controls the zeroth through (6M−1)-th tap coefficients $a_i$ so that an error signal or difference power becomes minimum between the reproduced signals re and the decided information signals rd1 in a known manner. This means that the zeroth through (6M−1)-th tap coefficients are adaptively varied with time in accordance with the error signal between the reproduced signals re and the decided information signals so as to converge the error signal into zero. A time is required to converge the error signal into zero for some time.

Taking this into consideration, a sequence of training signals which is previously known is transmitted from the mobile station, such as MS1, and received by the base station, such as BS1, immediately after reception of the burst is started. Such transmission and reception of a training signal sequence lasts until convergence of the tap coefficients $a_i$ is completed.

After completion of convergence of the tap coefficients $a_i$, the decision circuit 75 produces a sequence of correct information signals as the judged information signal sequence rd1. Once the convergence of the tap coefficients $a_i$ is completed, it is possible to make the adaptive filter 57 adaptively follow or trace a variation in a path characteristic by modifying the tap coefficients so that the error signal becomes minimum between the reproduced signals re and the judged information signal sequence rd1.

As algorithm for minimizing the error signal mentioned above, it is possible to use least mean square (LMS) algorithm or recursive least square (RLS) algorithm. The LMS algorithm can be executed by the use of simple circuitry but requires a comparatively long time for convergence. On the other hand, the RLS algorithm enables quick convergence but can not be executed by the use of simple circuitry. Any other algorithm except the LMS algorithm and the RLS algorithm may be used in the adaptive controller 61. At any rate, circuitry for such algorithm can be simply structured by a known technique and will not be described any longer.

Herein, it is to be noted that the error signal is dominantly produced on the basis of the interference signal directed to the other base stations, such as BS2, and a noise of the base station receiver itself. Under the circumstances, it is preferable that the adaptive filter 57 is operated so that the interference signal is cancelled when electric power of the interference signal is very large in comparison with electric power of the noise of the base station receiver.

Moreover, each mobile station MS moves from a cell to another cell in the mobile communication. In addition, out-of sight communication is carried out between the mobile stations MS and the base stations BS. This inevitably brings about multipath fading.

Taking the above into account, the adaptive controller 61 should follow a variation of a path characteristic resulting from the multipath fading. As mentioned before, since the illustrated adaptive controller 61 carries out adaptive operation one time per a single bit or symbol, the adaptive controller 61 readily follows the variation of the path with an increase of the bit or symbol rate. Furthermore, a convergence speed becomes fast in the adaptive controller 61 as a power ratio (S/I) of its own reception signal and the interference signal becomes large.

It is noted that L-multiplexed time division multiple access (TDMA) is adopted in the embodiment, as mentioned before, and serves to realize L-times the bit rate in comparison with the case where no TDMA is adopted. This means that the base station receiver can follow fading which varies at a speed equal to L-times. Furthermore, when the number of channels to which an identical frequency is assigned is assumed to be constant, the power ratio (S/I) becomes about L-times and therefore, the convergence speed is also improved in the above embodiment.

On the other hand, the code division multiple access (CDMA) of the spread factor M is also carried out in the above embodiment. Such CDMA is effective to mitigate or reduce a synchronous speed or precision to 1/M as compared with the case where M×L multiplexed TDMA would be executed and to reduce a peak of transmission electric power to 1/M.

As mentioned before, the adaptive filter 57 is used to suppress the interference signal, which makes it possible to use a single time slot by a plurality of channels, as illustrated in FIG. 4, and to avoid a reduction of the number of the channels which are necessary in the M×L multiplexed TDMA. In addition, the same frequency can be used in adjacent ones of cells because the interference signal can be removed by the adaptive filter 57.

As to the multipath fading, an independent path can be separated from the other paths as the chip rate increases in the CDMA. This brings about an improved path diversity. However, the tap number of the adaptive filter 57 should be equal to six times the spread factor M, as mentioned in conjunction with in FIG. 5. Under the circumstances, it is readily understood that a high speed chip rate due to a large spread factor results in an increase of a size of hardware.

In the above embodiment, the chip rate is increased with the spread factor M kept at a suitable value, for example, 16 and therefore the path diversity effect is improved without enlarging the size of the hardware.

Figure 6:
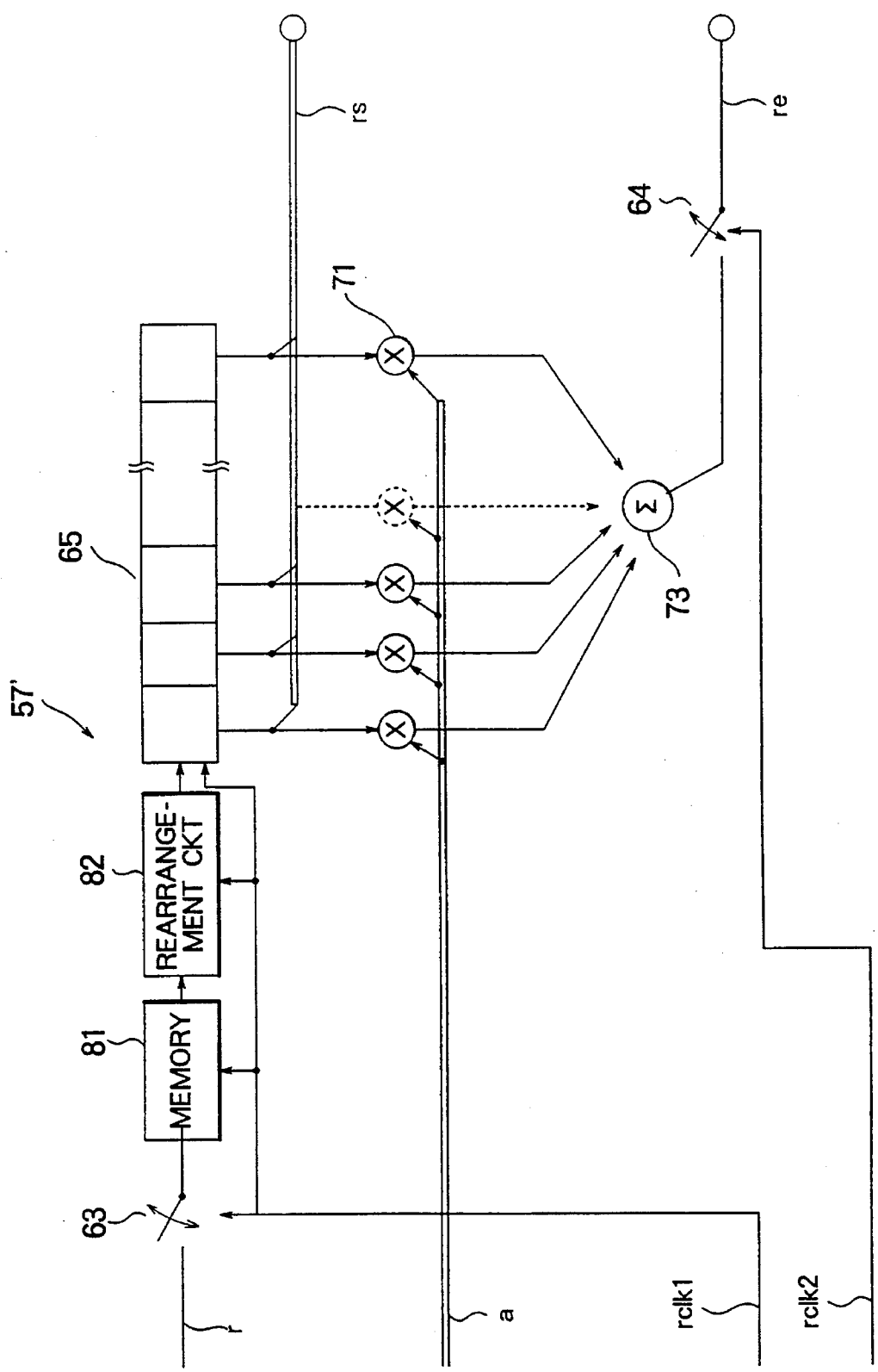
FIG. 6 is a similar block diagram of another adaptive filter used in the communication system illustrated in FIG. 2.

Referring to FIG. 6, an adaptive filter 57' according to another embodiment of this invention is applicable to the base station, such as BS1, BS2, illustrated in FIG. 2 and is similar in structure to that illustrated in FIG. 5 except that a memory 81 and a rearrangement circuit 82 are interposed between the first sampler 63 and the shift register 65. As mentioned in conjunction with FIG. 5, the baseband signal sequence r is sampled at the sample rate equal to twice the chip rate and is sent into the memory 81 as a sequence of sampled signals. The memory 81 has a memory capacity for memorizing the sampled signals for a single time slot and is operable in synchronism with the first reception clocks rclk1 like in the first sampler 63. Consequently, the sampled signals for the single time slot are successively memorized in the memory 81 and are thereafter supplied to the rearrangement circuit 82. The rearrangement circuit 82 rearranges the sampled signals into a sequence of rearranged signals which is sent to the shift register 65 operable as a part of the finite impulse response filter, in a manner to be described later.

Figure 7:
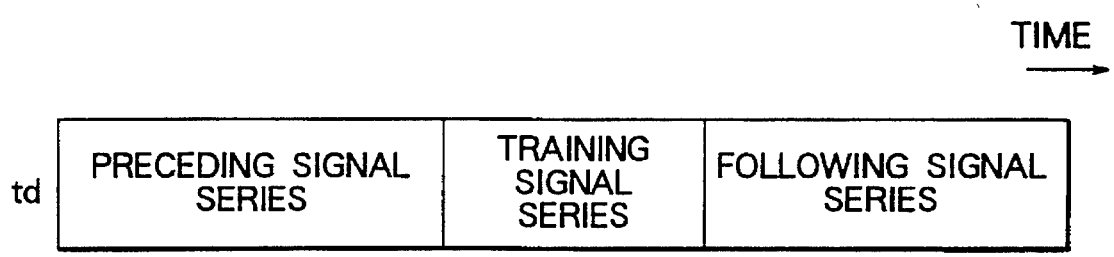
FIG. 7 is a time chart for use in describing a training signal used in FIG. 6.

Referring to FIG. 7 together with FIG. 6, description will be made about the rearrangement circuit 82. The transmission signal td is exemplified which is transmitted from the mobile station, such as MS1, to the base station, such as BS1. The transmission signal td is transmitted in the form of a burst as shown in FIG. 7 and includes a preceding signal series, a following signal series, and a training signal series intermediate between the preceding and the following signal series. The training signal series may have a pattern known in the art and may be formed by a code series peculiar to each channel so as to distinguish among the channels which use a common time slot TM. For example, the training signal series for the respective channels may be given by preparing M sequences, namely, maximum-length-sequence codes and by successively shifting a phase of the M sequences at every channel to provide a plurality of different training series.

As mentioned in FIG. 7, the training signal series is located in a center region between the preceding and the following signal series. Let the reason be simply described hereinunder. At first, a leading portion of the burst or the baseband signal sequence is somewhat or subtly different from one another at every channel due to differences of transmission delay times. This brings about subtle deviation of a start timing of each burst. As a result, the interference appearing at the leading portion of the burst is different from that appearing in the burst. Accordingly, when the adaptive filter 57 is trained by the leading portion of the burst, it is feared that the adaptive filter 57 may not be set into optimum values.

Thus, when adaptive operation of the training signal series is started at the center portion of the burst and is thereafter carried out forwards and backwards, it is possible to equivalently shorten a burst length and to decrease a possibility that the adaptive operation is put into a disordered state in the middle of the burst.

Taking the above into consideration, the rearrangement circuit 82 shown in FIG. 6 rearranges the baseband signal sequence r so that the training signal series is located at a leading portion. The adaptive filter 57' illustrated in FIG. 6 is at first therefore supplied with the training signal series. Thus, the adaptive filter 57' is initially trained by the training signal series.

As mentioned above, the mobile transmitter included in the mobile station MS generates the radio output signal by the use of a combination of TDMA and CDMA while the base station receiver included in the base station BS uses an interference canceler implemented by the adaptive filter. With this structure, it is possible to remarkably improve a characteristic. More specifically, multipaths can be separated from one another to achieve the path diversity effect because the chip rate can be increased. Since the spread factor can be determined independently of the chip rate, it is possible to suppress the multiplex number in the CDMA to less than a predetermined number, without lowering a frequency utilization efficiency. This enables to shorten an initial synchronous operation and to reduce the number of the taps of the adaptive filter.

Furthermore, since the bit rate can be increased in comparison with a variation speed of fading, the adaptive filter can quickly follow the variation on the transmission path. In addition, the multibit rate service can be performed by allocating a plurality of time slots to a single channel.

While this invention has thus far been described in conjunction with a preferred embodiment thereof, it will be readily understood for those skilled in the art to put this invention into practice in various other manners. For example, a frequency division multiple access (FDMA) technique may be also used in combination with the TDMA and the CDMA techniques.

What is claimed is:

1. A mobile station for use in a radio communication system to produce a radio output signal, said mobile station comprising a transmitter operable in response to a sequence of transmission signals which is divisible into a succession of frames and which has a predetermined rate, said transmitter comprising:

rate converting means supplied with said transmission signal sequence for successively rate converting said transmission signal sequence into a sequence of rate converted signals which has a second rate higher than said first rate and which lasts for a time slot shorter than each of said frames;

spread code producing means producing a preselected spread code which is assigned to said transmitter and which is divided into a plurality of chips;

code division multiple access means supplied with said preselected spread code and said rate converted signal sequence for carrying out code division multiple access operation of said rate converted signal sequence in accordance with said preselected spread code to produce a sequence of spread signals which is related to said preselected spread code; and means producing said spread signal sequence as said radio output signal by allocating said spread signal sequence to at least one specific time slot predetermined for said transmitter.

2. A mobile station as claimed in claim 1, wherein said code division multiple access means comprises:

a multiplier for multiplying said rate converted signal sequence by said preselected spread code to produce a sequence of product signals representative of products of said rate converted signal sequence and said preselected spread code; and means for producing said product signals as said spread signal sequence.

3. A mobile station as claimed in claim 1, each of said frames being divided into first through L-th ones of the time slots where L is an integer greater than unity, said mobile station being assigned with a predetermined one of the first through the L-th time slots, wherein said preselected spread code has a spread factor of M where M is an integer greater than unity and a chip rate equal to a product of L and M.

4. A mobile station as claimed in claim 1, each of said frames being divided into a plurality of the time slots, said mobile station being assigned with a plurality of the time slots.

5. A mobile station as claimed in claim 1, wherein said rate converting means is a rate converter.

6. A mobile station as claimed in claim 1, wherein said spread code producing means is a spread code generator.

7. A communication system comprising a transmitter and a receiver, said transmitter being operable in response to a sequence of transmission signals to produce a radio output signal, said transmission signal sequence being divisible into a succession of frames and having a first rate, said transmitter comprising:

rate converting means supplied with said transmission signal sequence for successively rate converting said transmission signal sequence into a sequence of rate converted signals which has a second rate higher than said first rate and which lasts for a time slot shorter than each of said frames;

spread code producing means producing a preselected spread code assigned to said transmitter and divided into a plurality of chips produced at a predetermined chip rate;

code division multiple access means supplied with said preselected spread code and said rate converted signal sequence for carrying out code division multiple access operation of said rate converted signal sequence in accordance with said preselected spread code to produce a sequence of spread signals which is related to said preselected spread code; and means for producing said spread signal sequence as said radio output signal by allocating said spread signal sequence to at least one specific time slot predetermined for said transmitter.

8. A communication system as claimed in claim 7, said receiver being given said radio output signal as a reception input signal which conveys said spread signal sequence, to produce a sequence of reception output signals, said receiver comprising:

demodulating means supplied with said reception input signal for demodulating said reception input signal into a sequence of baseband signals concerned with said spread signal sequence;

adaptive filter means coupled to said demodulating means for adaptively filtering said baseband signal sequence to produce a sequence of reproduced signals corresponding to said transmission signal sequence; and output means producing said reproduced signal sequence as said reception output signal sequence.

9. A communication system as claimed in claim 8, wherein:

said receiver further comprises:

a timing generator for producing first and second clock sequences having first and second clock rates which are higher than said chip rate and equal to said second rate, respectively; and an adaptive controller coupled to said adaptive filter means and said timing generator for controlling said adaptive filter means by a control signal to make said adaptive filter means produce said reproduced signal sequence;

said adaptive filter means comprises:

a first sampler, which is supplied with said baseband signal sequence and which is operable in response to said first clock sequence, for sampling said baseband signal sequence at said first clock rate into a sequence of sampled signals;

a shift register having a plurality of states and taps derived from the respective stages for successively storing said sample signal sequence to produce stored sampled signals as tap output signals through the respective taps;

multiplying means multiplying said tap output signals by said control signal to produce a plurality of product signals representative of products of said control signal and said tap output signals;

summing means for summing up said product signals into a sum signal representative of a sum of said product signals; and a second sampler, which is supplied with said sum signal and said second clock sequence, for sampling said product signals at said second clock rate to produce said reproduced signal sequence.

10. A communication system as claimed in claim 9, wherein said timing generator is supplied with said reception output signal and said reproduced signal sequence and is operated in accordance with predetermined algorithm to produce tap coefficient signals as said control signal such that an error signal becomes minimum between said reception output signal sequence and said reproduced signal sequence.

11. A communication system as claimed in claim 8, wherein:

said receiver further comprises:

a timing generator for producing first and second clock sequences having first and second clock rates which are higher than said chip rate and equal to said second rate, respectively; and an adaptive controller coupled to said adaptive filter means and said timing generator for controlling said adaptive filter means by a control signal to make said adaptive filter means produce said reproduced signal sequence;

said adaptive filter means comprises:

a first sampler, which is supplied with said baseband signal sequence and which is operable in response to said first clock sequence, for sampling said baseband signal sequence at said first clock rate into a sequence of sampled signals;

rearranging means rearranging said sampled signal sequence into a sequence of rearranged signals;

a shift register having a plurality of stages and taps derived from the respective stages for successively storing said rearranged signal sequence to produce stored rearranged signals as tap output signals through the respective taps;

multiplying means multiplying said tap output signals by said control signal to produce a plurality of product signals representative of products of said control signal and said tap output signals;

summing means for summing up said product signals into a sum signal representative of a sum of said product signals; and a second sampler, which is supplied with said sum signal and said second clock sequence, for sampling said product signals at said second clock rate to produce said reproduced signal sequence.

12. A communication system as claimed in claim 11, wherein said adaptive controller is supplied with said reception output signal sequence and said reproduced signal sequence and is operated in accordance with predetermined algorithm to produce tap coefficient signals as said control signal such that an error signal becomes minimum between said reception output signal sequence and said reproduced signal sequence.

13. A communication system as claimed in claim 12, wherein said adaptive controller is further supplied with said tap output signals which includes a training signal and initially trains said adaptive filter means by the use of said training signal.

14. A communication system as claimed in claim 13, wherein said training signal is included in said rearranged signal sequence and is initially given to said shift register by rearranging said sampled signal sequence by said rearranging means.

15. A communication system as claimed in claim 14, wherein said training signal in said sampled signal sequence is located between information signals carried by said reception input signal.

16. A communication system as claimed in claim 8, wherein said demodulating means is a demodulator.

17. A communication system as claimed in claim 8, wherein said adaptive filter means is an adaptive filter.

18. A communication system as claimed in claim 7, wherein said rate converting means is a rate converter.

19. A communication system as claimed in claim 7, wherein said spread code producing means is a spread code generator.

20. A receiver for use in a radio communication system to produce a sequence of reception output signals in response to a radio input signal which is divisible into a succession of frames and which conveys a spread signal sequence in a predetermined time slot formed by dividing each frame, said receiver comprising:

demodulating means being provided with said radio input signal for demodulating said radio input signal into a sequence of baseband signals concerned with said spread signal sequence;

adaptive filter means, which is coupled to said demodulating means and which has a plurality of taps for adaptively filtering said baseband signal sequence to produce a sequence of reproduced signals by adaptively controlling said taps; and output means producing said reproducing signal sequence as said reception output signal sequence.

21. A receiver as claimed in claim 20, wherein said demodulating means is a demodulator.

22. A receiver as claimed in claim 20, wherein said adaptive filter means is an adaptive filter.

* * * * *